No. 730,405. PATENTED JUNE 9, 1903.
M. C. RYPINSKI.
HOT WIRE INSTRUMENT.
APPLICATION FILED MAR. 31, 1902.

NO MODEL.

Witnesses.

Inventor.
Maurice C. Rypinski.
by Albert G. Davis
Atty.

No. 730,405.   Patented June 9, 1903.

UNITED STATES PATENT OFFICE.

MAURICE C. RYPINSKI, OF SCHENECTADY, NEW YORK, ASSIGNOR TO GENERAL ELECTRIC COMPANY, A CORPORATION OF NEW YORK.

HOT-WIRE INSTRUMENT.

SPECIFICATION forming part of Letters Patent No. 730,405, dated June 9, 1903.

Application filed March 31, 1902. Serial No. 100,672. (No model.)

*To all whom it may concern:*

Be it known that I, MAURICE C. RYPINSKI, a citizen of the United States, residing at Schenectady, county of Schenectady, State of New York, have invented certain new and useful Improvements in Hot-Wire Instruments, of which the following is a specification.

This invention relates to instruments for measuring the potential or the strength of electric currents, and especially those in which the indications are caused by the expansion and contraction of a wire due to the varying temperature of the wire produced by variations in the current flowing through it.

The object of the invention is to increase the sensitiveness of such an instrument without rendering it too delicate in construction or impairing its accuracy.

Figure 1:
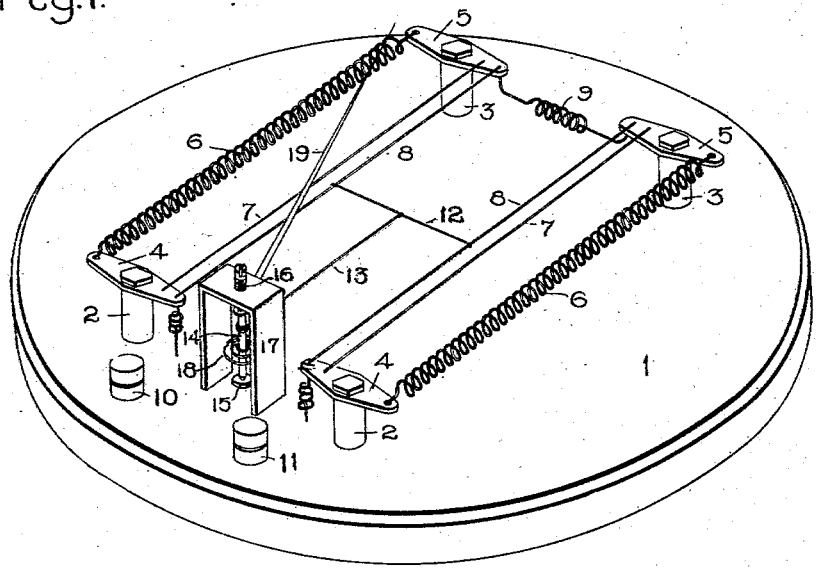
Figure 2:
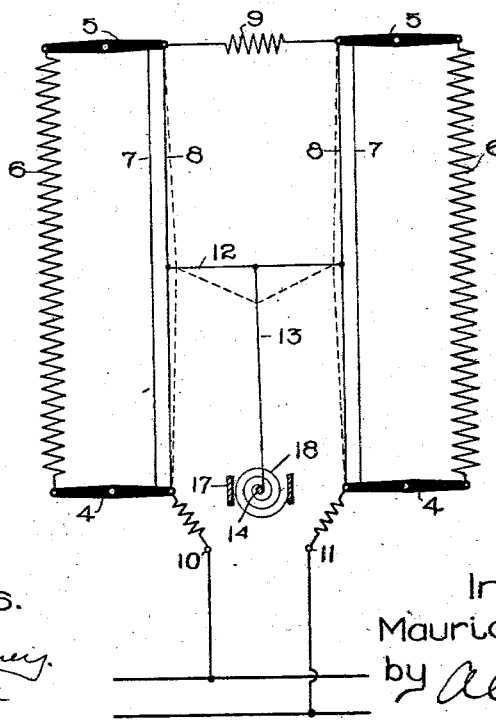

In the accompanying drawings, Figure 1 is a perspective view of my new hot-wire instrument. Fig. 2 is a top plan view of the same, partly in section.

On a suitable base-plate 1 are erected two pairs of short posts 2 3, and on said posts are pivoted levers 4 5. The outer ends of each pair of levers are connected by a spring 6, which keeps taut two parallel wires 7 8, connecting the inner ends of said levers. The wires 7 are not in circuit, being employed to produce a compensating effect, as hereinafter explained.

The two wires numbered 8 are connected at one end by a flexible conductor 9. Their other ends are connected by flexible wires with the binding-posts 10 11, respectively, which receive the terminals of the circuit in which the current is to be measured.

The two hot wires 8 are connected at about their middle points by a taut thread 12, running at right angles to the wires. To the middle point of said thread is connected a thread 13, running at right angles thereto and attached to the arbor 14, on which it is wound. The arbor is pivoted in bearings 15 16, the latter being adjustable in an arch 17, erected on the base-plate. A spiral spring 18, concentric with the arbor, has one end attached to said arbor and the other to the arch. The arbor carries a needle 19, which may coöperate with a suitable scale. (Not shown.) In Fig. 2 the arbor and arch are shown in section, the needle being removed. The spiral spring 18 is so arranged that its tension tends to wind up on the arbor any slack in the thread 13.

The operation of the instrument is as follows: When the wires 8 expand from the heating effect of the current, the sag in said wires causes a slackness in the thread 12, which connects them. This slack is taken up by the spiral spring 18, winding up the thread 13, and the movement of the needle indicates on the scale the current flowing in the circuit. The dotted lines in Fig. 2 illustrate on an exaggerated scale the sag of the hot wires and the thread. The action is similar to that of three connected toggle-joints, and it follows, therefore, that a very slight change in the length of the wire 8 will result in an enormous multiplication of the same at the arbor of the needle. The instrument is thus extremely sensitive and indicates very small variations in current strength.

Any change in the length of the wire 8 due to variations in atmospheric temperature will be duplicated in the compensating wire 7, which permits the slack in both to be taken up by the spring 6, so that the needle will not be affected by temperature changes.

While the duplex arrangement of wires and springs shown in the drawings is preferred on account of its greater sensitiveness, yet it is evident that one pair of levers, with the connected wires, may be dispensed with and the thread 12 connected at that end to a fixed support. Moreover, in place of the levers 4 5 and spring 6 any equivalent device for putting a tension on the wires 7 8 may be employed.

What I claim as new, and desire to secure by Letters Patent of the United States, is—

1. A hot-wire electrical measuring instrument comprising a stretched wire adapted to carry current, an elastic abutment to maintain it under tension, an indicator to determine its amount of sag, and a compensating wire connected to the abutment and disconnected from the circuit.

2. A hot-wire electrical measuring instrument comprising a stretched wire adapted to carry current, an elastically-yielding abutment to maintain it under tension, an indicator to determine the amount of its sag, and a compensating wire having the same temperature coefficient restraining the movement of the abutment.

3. A hot-wire electrical measuring instrument, comprising two levers, a hot wire and a compensating wire connecting corresponding ends of said levers, a spring connecting their other ends, a thread attached to the middle of the hot wire, and a needle connected with said thread.

4. A hot-wire electrical measuring instrument, comprising two hot wires adapted to be connected in circuit, elastic tension devices, compensating wires connected to the same tension devices, a stretched thread connecting the middle points of said hot wires, a needle on an arbor, a thread wound on the arbor and attached to the stretched thread, and a spring on the arbor for taking up slack in said threads.

5. A hot-wire electrical measuring instrument, comprising two pairs of levers, a hot wire and a compensating wire connecting corresponding ends of said levers in each pair, a spring connecting the other ends of the levers in each pair, a stretched thread attached at each end to the two hot wires, an arbor carrying a needle, a thread attached to the stretched thread and wound on the arbor, and means for rotating the arbor to wind up the slack in said thread.

6. The combination with the base-plate 1, of the posts 2 3, the levers 4 5 pivoted on said posts, the springs 6 and the wires 7 8 connecting said levers, the flexible wire 9 connecting the wires 8 at one end, the binding-posts 10 11 connected respectively with the other ends of said wires 8, the thread 12 attached to the wires 8, the thread 13 attached to the thread 12, the arbor 14 having the thread 13 wound on it and carrying the needle 19, and the spiral spring 18 attached to the arbor and acting to keep a tension on the thread 13.

7. In a hot-wire electrical measuring instrument, the combination with two pivoted levers, of a spring connecting corresponding ends of the levers, two parallel wires connecting their opposite ends, and means for sending a current through one of said wires.

8. In a hot-wire electrical measuring instrument, the combination of the hot wire, an elastic abutment to maintain the wire under tension, a compensating device for variations in atmospheric temperature connected to the elastic abutment, an indicating-needle, and connections between said wire and needle for multiplying the sag of the wire, said connections operating on the principle of the toggle-joint.

In witness whereof I have hereunto set my hand this 27th day of March, 1902.

MAURICE C. RYPINSKI.

Witnesses:
BENJAMIN B. HULL,
HELEN ORFORD.